US006030690A

United States Patent [19]

McNeil et al.

[11] Patent Number: 6,030,690

[45] Date of Patent: Feb. 29, 2000

[54] HIGH PRESSURE EMBOSSING AND PAPER PRODUCED THEREBY

[75] Inventors: Kevin Benson McNeil, Loveland; Linda Rae Scherzinger, West Chester; Thomas Anthony Hensler, Cincinnati; Rebecca Ann Miller, Cincinnati; Barbara Ann Ludwig, Cincinnati, all of Ohio

[73] Assignee: The Procter & Gamble Company, Cincinnati, Ohio

[21] Appl. No.: 08/847,553

[22] Filed: Apr. 23, 1997

[51] Int. Cl.$^7$ ................................ B32B 3/00; B31F 1/22; D21H 11/00

[52] U.S. Cl. .......................... 428/156; 428/153; 162/109; 156/209

[58] Field of Search .................................... 428/153, 156, 428/167, 120, 141, 537.5; 162/111, 113, 117, 109; 156/209, 219

[56] References Cited

U.S. PATENT DOCUMENTS

| | | | |
|---|---|---|---|
| 701,734 | 6/1902 | Jenks | 428/156 |
| 2,043,351 | 6/1936 | Fourness et al. | 154/33 |
| 2,874,618 | 2/1959 | Yang | 428/153 |
| 3,323,983 | 6/1967 | Palmer et al. | 162/362 |
| 3,377,224 | 4/1968 | Gresham et al. | 156/209 |
| 3,414,459 | 12/1968 | Wells | 161/131 |
| 3,478,141 | 11/1969 | Dempsey et al. | 264/284 |
| 3,547,723 | 12/1970 | Gresham | 156/209 |
| 3,556,907 | 1/1971 | Nystrand | 156/470 |
| 3,684,603 | 8/1972 | Iltis | 156/152 |
| 4,481,243 | 11/1984 | Allen | 428/154 |
| 4,659,608 | 4/1987 | Schulz | 428/171 |
| 4,902,553 | 2/1990 | Hwang et al. | 428/156 |
| 5,173,351 | 12/1992 | Ruppel et al. | 428/1.74 |
| 5,383,778 | 1/1995 | Schulz | 425/363 |
| 5,436,057 | 7/1995 | Schulz | 428/156 |

FOREIGN PATENT DOCUMENTS

| | | |
|---|---|---|
| WO 92/14605A | 9/1992 | European Pat. Off. . |
| WO 95/11796 | 5/1995 | European Pat. Off. . |
| 0 668 152 A1 | 8/1995 | European Pat. Off. . |
| WO 95/27429 | 10/1995 | WIPO . |
| WO 96/40497 | 12/1996 | WIPO . |

*Primary Examiner*—Donald Loney
*Attorney, Agent, or Firm*—Larry L. Huston; E. Kelly Linman; Jacobus C. Rasser

[57] ABSTRACT

A process for high pressure embossing a single ply of paper and the paper produced thereby. The embossing process requires two rolls, a pattern roll 30 and an anvil roll 32. The rolls are loaded together at a pressure of at least 1000 psi at the nip. A single ply of paper is embossed in the nip. The embossments of the paper do not extend outwardly beyond the thickness of the paper to have any out-of-plane deformation. The embossments are typically glassined. The resulting paper has an aesthetically pleasing appearance, without undue loss of tensile strength from the embossing process.

17 Claims, 2 Drawing Sheets

HIGH PRESSURE EMBOSSING AND PAPER PRODUCED THEREBY

FIELD OF THE INVENTION

The present invention relates to embossing of paper, and particularly to decorative embossing of a single ply of tissue paper.

BACKGROUND OF THE INVENTION

Embossing is well known in the art. Embossing is a common technique used to join two plies of paper together in order to form a multi-ply laminate. The resulting laminate has properties, such as caliper, flexibility, and absorbency, not attainable from a single ply having twice the basis weight of either constituent ply.

The prior art teaches embossing two plies of paper together. Embossing is accomplished by one of several known embossing processes, such as knob-to-knob embossing or dual ply lamination. The foregoing processes are illustrated by commonly assigned U.S. Pat. Nos. 3,414,459 issued Dec. 3, 1968 to Wells and 5,294,475 issued Mar. 15, 1994 to McNeil, the disclosures of which patents are incorporated herein by reference. Yet another embossing process for joining two plies together is nested embossing, as is well known in the art.

With each of the foregoing embossing processes, embossments are deflected out of the plane of the paper. Such deflection may desirably increase the caliper of that ply, and hence the laminate. Conventional embossing may increase caliper 25 to 135 percent as the emboss pressures deform the fibers out of the plane of the paper.

By embossing out of the plane of the paper it is meant that the embossments extend outwardly from the original thickness of the unembossed paper. Thus, embossments which are deformed out of the plane of the paper extend outwardly from the surface of the paper thereby increasing its caliper. The aesthetic clarity of the embossed pattern is directly proportional to the magnitude of the out-of-plane deformation of these embossments.

There is an associated loss in tensile strength caused by the out-of-plane embossments. A common through air dried substrate, such as that found in CHARMIN bath tissue sold by The Procter & Gamble Company of Cincinnati, Ohio, has suffered a 20 to 40 percent tensile loss during conventional embossing processes. Additionally, prior art embossing often degrades softness. The softness degradation is believed to be due to the tactile sensation caused by the out of plane embossments.

Typical prior art embossing processes rely upon a conventional rubber anvil roll and a steel pattern roll to form the aesthetic pattern. The aesthetic pattern results from the deformation of the fibers out of the plane of the paper when the plies are embossed against the deformable anvil roll.

One prior art attempt to emboss an aesthetic pattern onto paper is illustrated by U.S. Pat. No. 5,436,057 issued Jul. 25, 1995 to Schulz. As illustrated by FIGS. 13–14 of Schulz '057, this attempt requires embossing the paper out of its plane to form the embossments.

A similar attempt in the art is illustrated by European Patent Application 0 668 152 A1 published Aug. 23, 1995 in the names of Kamps et al. Kamps et al. also suffers from the drawback, illustrated by FIG. 10, that the sheets are embossed out of the plane of the paper. Neither Schulz '057 nor Kamps et al. suggests embossing an aesthetic pattern within the plane of the paper.

Other attempts in the art have utilized relatively high embossing pressures. However, such attempts are limited to joining multiple plies of paper together. For example, U.S. Pat. No. 3,377,224 issued Apr. 9, 1968 to Gresham et al. teaches embossing two plies of differentially creped paper together without adhesive. The process requires 1/32 inch square bosses.

A similar attempt is found in U.S. Pat. No. 3,323,983 issued Jun. 6, 1967 to Palmer et al. Palmer et al. teaches an embossing process which fixes together plies of thin creped paper. Neither Gresham nor Palmer et al. suggests embossing a single ply of paper. Instead, each teaching limits the embossing process to joining together two or more plies of paper.

Commonly assigned European Patent Application WO 95/27429 filed Apr. 12, 1995 in the names of Reinheimer et al. teaches a cellulose cloth comprising at least two layers. The layers are joined with an embossed pattern of individual spot shaped impressions which deform and mutually connect the tissues of the cloth. The impressions are formed by embossed spots which originate from the outer layers of tissue and curve concavely inwardly.

In contrast, embossing according to the present invention utilizes only a single ply of paper. The aesthetic pattern resulting from embossing the single ply lies within the plane of the paper.

Furthermore, embossing according to the present invention reduces the associated loss of tensile strength. The tensile strength loss associated with embossing according to the present invention is typically less than 10 percent, and in some cases less than 5 percent.

Furthermore, the present invention decouples pattern clarity and the magnitude of the out-of-plane deformation of the embossments. In the present invention, pattern clarity is not determined by the depth of the embossments. Instead pattern clarity is determined by the reflective nature of the embossments. Particularly, the embossments are often glassined and are more reflective than the unembossed regions of the paper.

Embossing according to the present invention increases the modulus of the paper. The modulus, in grams per centimeter, is the slope of the stress/strain curve of the paper as it is loaded in a tensile testing machine at a constraint elongation rate of one inch per minute, using a two inch gage length and a four inch sample width. The slope is measured at a load of 15 grams per centimeter of sample width.

Accordingly, it is an object of the present invention to provide an embossed paper which does not have out-of-plane embossments. It is also an object of the present invention to provide an embossed paper which does not suffer an undue loss of tensile strength as a result of the embossing process.

It is further an object of the invention to provide a single ply of paper having a visually distinctive embossed pattern. It is finally an object of the invention to decouple the clarity of the emboss pattern from the depth of the embossment.

SUMMARY OF THE INVENTION

The invention comprises a single ply of paper having two sides, a first side and a second side opposed thereto. The first and second sides of the paper are separated by the thickness thereof. The paper is embossed to have embossments. The embossments extend inwardly from the first side of the paper, towards the second and the opposed side of the paper. The embossments do not extend outwardly from either side of the paper.

The paper may also have embossments extending inwardly from the second side of the paper. If the paper is provided with embossments extending inwardly from the second side, such embossments, likewise, do not extend outwardly from the paper. The embossments on the second side of the paper may either be registered with or offset from the embossments on the first side of the paper.

Preferably, the embossments comprise glassined regions in the paper. Glassined regions have a generally increased reflectivity and provide an aesthetic benefit.

Preferably, the surface topography of the unembossed regions of the paper is relatively fine compared to the size of the embossments, so that aesthetic clarity is maintained.

DETAILED DESCRIPTION OF THE INVENTION

Figure 1:
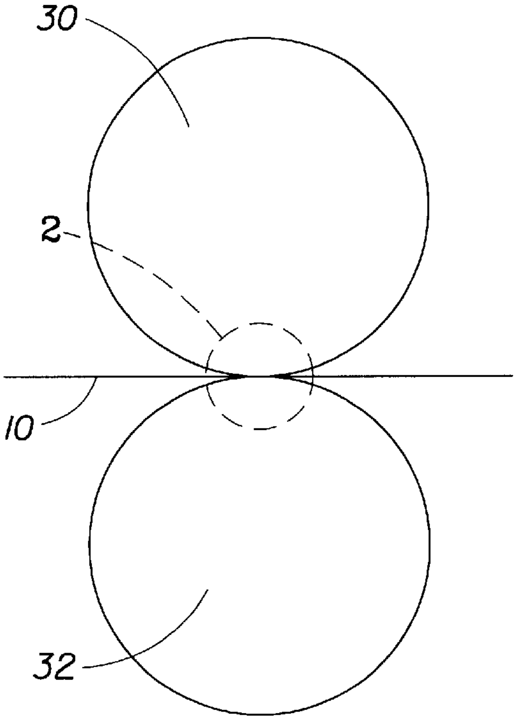
FIG. 1 is a schematic side elevational view of an apparatus for embossing paper according to the present invention.
Figure 2:
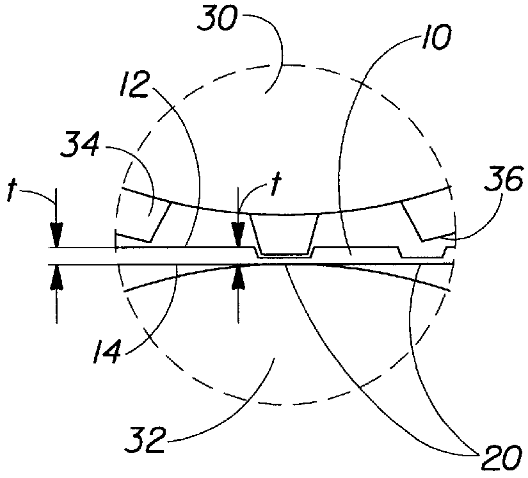
FIG. 2 is an enlarged fragmentary view of FIG. 1, illustrating embossments which lie within the plane of the paper.

Referring to FIGS. 1–2, the present invention comprises paper 10, and more particularly a single ply of paper 10. The single ply of paper 10 has two opposed sides, a first side 12 and a second side 14. The paper 10 has a thickness T defined by the distance between the opposed first and second sides 12, 14.

The paper 10 according to the present invention is commonly described as and useful for facial tissue, bath tissue, paper towels, dinner napkins, wet wipes, handkerchiefs, and a variety of related uses. One of ordinary skill will be able to adapt the paper 10 of the present invention to the desired end use.

The plane of the paper 10 defines its X-Y dimensions. Perpendicular to the X-Y dimensions of the paper 10 and to the plane of the paper 10 is the Z-direction of the paper 10. The thickness T of the paper 10 is measured in the Z-direction.

The paper 10 further has embossments 20. Embossments 20 refer to regions in the paper 10 which have been subjected to densification or are otherwise compacted. The fibers comprising the paper 10 in the embossments 20 are preferably permanently and more tightly bonded together than the fibers in the regions of the paper 10 intermediate the embossments 20. The embossments 20 may be glassined. Preferably the embossments 20 are distinct from one another, although, if desired, the embossments 20 may form an essentially continuous network.

Figure 3:
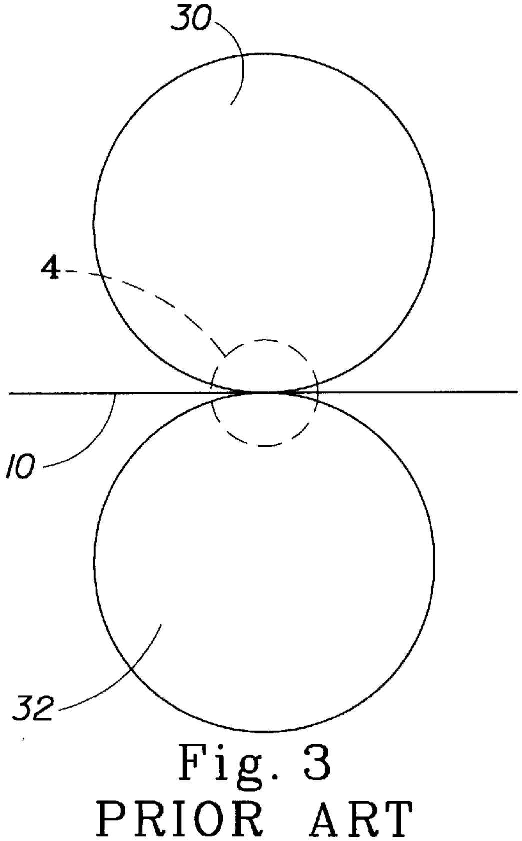
Fig. 3 PRIOR ART
FIG. 3 is a schematic side elevational view of an apparatus for embossing paper according to the prior art.
Figure 4:
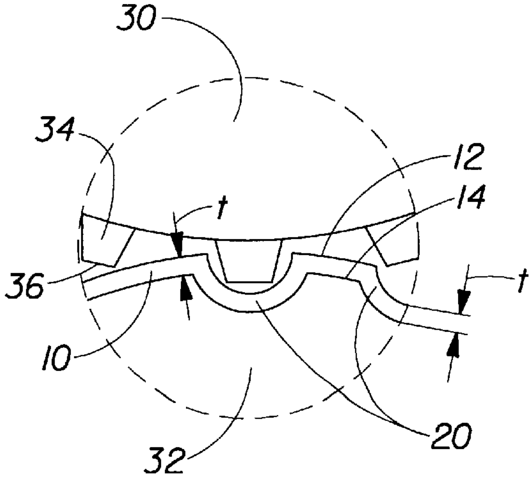
Fig. 4 PRIOR ART
FIG. 4 is an enlarged fragmentary view of FIG. 3, illustrating the out-of-plane embossments which do not lie within the plane of the paper.

In contrast to the prior art embossing process illustrated by FIGS. 3–4, the embossments 20 of the present invention do not extend outwardly beyond the plane defined by the two opposed sides of the paper 10. The embossments 20 extend inwardly from either the first side 12 of the paper 10, the second side 14 of the paper 10, or both as illustrated by FIGS. 1–2. If the embossments 20 extend inwardly from both sides 12, 14 of the paper 10, the embossments 20 on one side 12 may either be registered with or offset from the embossments 20 extending inwardly from the other and opposite side 14 of the paper 10.

It is to be recognized that two single plies of paper 10, either or both of which are made according to the present invention, may be joined together in face-to-face relationship to form a laminate. Such joining and use of a plurality of single plies of paper 10 according to the present invention does not remove the paper 10 from the scope of the appended claims.

The substrate which comprises the paper 10 according to the present invention may be conventionally dried, using one or more press felts. If the substrate which comprises the paper 10 according to the present invention is conventionally dried, it may be conventionally dried using a felt which applies a pattern to the paper 10 as taught by commonly assigned U.S. Pat. No. 5,556,509 issued Sept. 17, 1996 to Trokhan et al. and PCT Application WO 96/00812 published Jan. 11, 1996 in the names of Trokhan et al., the disclosures of which are incorporated herein by reference.

Preferably, the substrate which comprises the paper 10 according to the present invention is through air dried. A suitable through air dried substrate may be made according to commonly assigned U.S. Pat. No. 4,191,609, the disclosure of which is incorporated herein by reference.

More preferably, the substrate which comprises the paper 10 according to the present invention is through air dried on a belt having a patterned framework. The framework preferentially imprints a pattern comprising an essentially continuous network onto the paper 10 and further has deflection conduits dispersed within the pattern. The deflection conduits extend between opposed first and second surfaces of the framework. The deflection conduits allow domes to form in the paper 10 according to the present invention. The belt according to the present invention may be made according to any of commonly assigned U.S. Pat. Nos. 4,637,859 issued Jan. 20, 1987 to Trokhan; 4,514,345 issued Apr. 30, 1985 to Johnson et al.; 5,328,565 issued Jul. 12, 1994 to Rasch et al.; and 5,334,289 issued Aug. 2, 1994 to Trokhan et al., the disclosures of which patents are incorporated herein by reference.

The through air dried paper 10 made according to the foregoing patents has a plurality of domes dispersed throughout an essentially continuous network region. The domes extend generally perpendicular to the paper 10 and increase its caliper. The domes generally correspond in geometry, and during papermaking in position, to the deflection conduits of the belt described above. The domes protrude outwardly from the essentially continuous network of the paper 10 due to molding into the deflection conduits during the papermaking process. By molding into the deflection conduits during the papermaking process, the regions of the paper 10 comprising the domes are deflected in the Z-direction. For the embodiments described herein, such a paper 10 may have at least 300 domes per square inch, although this figure is dependent upon the size of the embossments 20. Preferably, if the paper 10 has domes, or other prominent features in the topography, each embossment 20 in the paper 10 has an area at least 10 times and more preferably at least 100 times as great as the area of the dome or other prominent feature in the topography.

If a paper 10 having such domes is selected for the present invention, the domes may extend outwardly from a first side 12 of the paper 10, and the embossments 20 extend inwardly from either side of the paper 10. However, preferably, the embossments 20 extend inwardly from the second side 14 of the paper 10.

The paper 10 according to the present invention and having domes may be made according to commonly assigned U.S. Pat. Nos. 4,528,239 issued Jul. 9, 1985 to Trokhan; 4,529,480 issued Jul. 16, 1985 to Trokhan; 5,245,025 issued Sep. 14, 1993 to Trokhan et al.; 5,275,700 issued Jan. 4, 1994 to Trokhan; 5,364,504 issued Nov. 15, 1985 to Smurkoski et al.; and 5,527,428 issued Jun. 18, 1996 to Trokhan et al., the disclosures of which patents are incorporated herein by reference.

Several variations in the substrate used for the paper 10 according to the present invention are feasible and may, depending upon the application, be desirable. The substrate which comprises the paper 10 according to the present invention may be creped or uncreped, as desired. The paper 10 according to the present invention may be layered. Layering is disclosed in commonly assigned U.S. Pat. Nos. 3,994,771 issued Nov. 30, 1976 to Morgan et al.; 4,225,382 issued Sep. 30, 1980 to Kearney et al.; and 4,300,981 issued Nov. 17, 1981 to Carstens, the disclosures of which patents are incorporated herein by reference.

To further increase the soft tactile sensation of the paper 10, chemical softeners may be added to the paper 10. Suitable chemical softeners may be added according to the teachings of commonly assigned U.S. Pat. Nos. 5,217,576 issued Jun. 8, 1993 to Phan and 5,262,007 issued Nov. 16, 1993 to Phan et al., the disclosures of which patents are incorporated herein by reference. Additionally, silicone may be applied to the paper 10 according to the present invention as taught by commonly assigned U.S. Pat. Nos. 5,215,626 issued Jun. 1, 1993 to Ampulski et al. and 5,389,204 issued Feb. 14, 1995 to Ampulski, the disclosures of which patents are incorporated herein by reference. The paper 10 may be moistened, as disclosed in commonly assigned U.S. Pat. No. 5,332,118 issued Jul. 26, 1994 to Muckenfuhs, the disclosure of which patent is incorporated herein by reference.

Referring back to FIG. 2, embossing according to the present invention may be accomplished utilizing two cylindrical, axially parallel rolls 30, 32 juxtaposed to form a nip therebetween. The first roll is a pattern roll 30 and has protuberances 34 extending radially outwardly from the periphery of the roll 30. The second roll is an anvil roll 32 and has a surface which is smooth to the naked eye. Preferably the anvil roll 32 has a machined surface with a finish of 32 microinches per inch or less.

Neither the pattern roll 30 nor the anvil roll 32 deforms during the embossing process according to the present invention. While some theoretical deformation in response to an applied load may be predicted, the pattern and anvil rolls 30, 32 are sufficiently non-deformable and rigid to obviate deformation which permits out-of-plane embossments 20 to be formed in the paper 10. The anvil roll 32 may be a crown roll.

Each of the rolls 30, 32 is preferably steel and more preferably hardened, although any relatively non-deformable, rigid material may be used. If the rolls 30, 32 are steel, each roll 30, 32 should have a Rockwell C hardness of 20–25. Preferably, for maximum life, the rolls 30, 32 have a hardness of at least Rockwell C 50 and more preferably at least Rockwell C 58.

A rubber anvil roll 32, as illustrated by FIG. 4, and is known in the prior art, should generally not be used. Prophetically, in a less preferred embodiment, a very hard rubber roll, such as a rubber roll having a hardness of less than 10 P&J, measured with a 1/8 inch diameter ball, might be suitable for some applications.

Regardless of the materials used for construction, the anvil roll 32 must not deform during the embossing process. If deformation of the anvil roll 32 occurs, out of plane embossments will be formed in the paper 10 and loss of tensile strength will result.

One or both of the anvil roll 32 and pattern roll 30 may be internally heated. Prophetically, heating the anvil roll 32 and pattern roll 30 helps to achieve a glassined embossment 20 in the resulting paper 10.

With continuing reference to FIG. 2, the rolls 30, 32 may have a diameter of 8 to 30 inches, and preferably a diameter of 18 to 24 inches, with a 10 inch diameter having been found suitable. The rolls 30, 32 may have a length, taken in the axial direction, of eight inches. Preferably the rolls 30, 32 are wider than eight inches in order to accommodate commercial manufacturing. Prophetically rolls 30, 32 having a width of 80 inches or more are feasible.

The pattern roll 30 and anvil roll 32 are diametrically loaded together along the plane connecting the centers of the rolls 30, 32. The rolls 30, 32 may be loaded together by pneumatic or preferably hydraulic loading cylinders. Preferably there is one loading cylinder at each end of the roll or rolls 30, 32 to be pneumatically loaded. Preferably the pattern roll 30 is stationary and the anvil roll 32 is loaded, although if desired, the opposite arrangement could be used. Alternatively, each roll 30, 32 could be pneumatically loaded and biased towards the other roll 30, 32. Load cells may be placed under each roll 30, 32 to equalize the loading across the nip and allow for monitoring pressure fluctuations during embossing.

Embossing according to the present invention occurs at an embossing pressure of at least about 1,000 psi, and preferably 1,000 to about 10,000 psi, and more preferably about 3,000 to about 5,000 psi. The desired embossing pressure is dependent upon the substrate, particularly the caliper, surface topography and furnish of the paper 10 to be embossed. As the surface texture topography increases, generally greater embossing pressure are required according to the present invention.

Embossing Pressure

The embossing pressure is determined by the following formula:

$$EP=AL/(NA\times PLA),$$

wherein EP is the embossing pressure,

AL is the applied load,

NA is the nip area, and

PLA is the pattern land area.

The applied load is the sum of the weight of the upper embossing roll (either the pattern roll 30 or the anvil roll 32 as the case may be) and the pressure applied through the loading cylinders used to compress the pattern roll 30 and anvil roll 32 together. If the loading plane connecting the centers of the anvil roll 32 and pattern roll 30 is not vertical, only the vertical component of the weight of the upper embossing roll 30, 32 (which is applied to the paper 10) is considered in determining the applied load.

Figure 5:
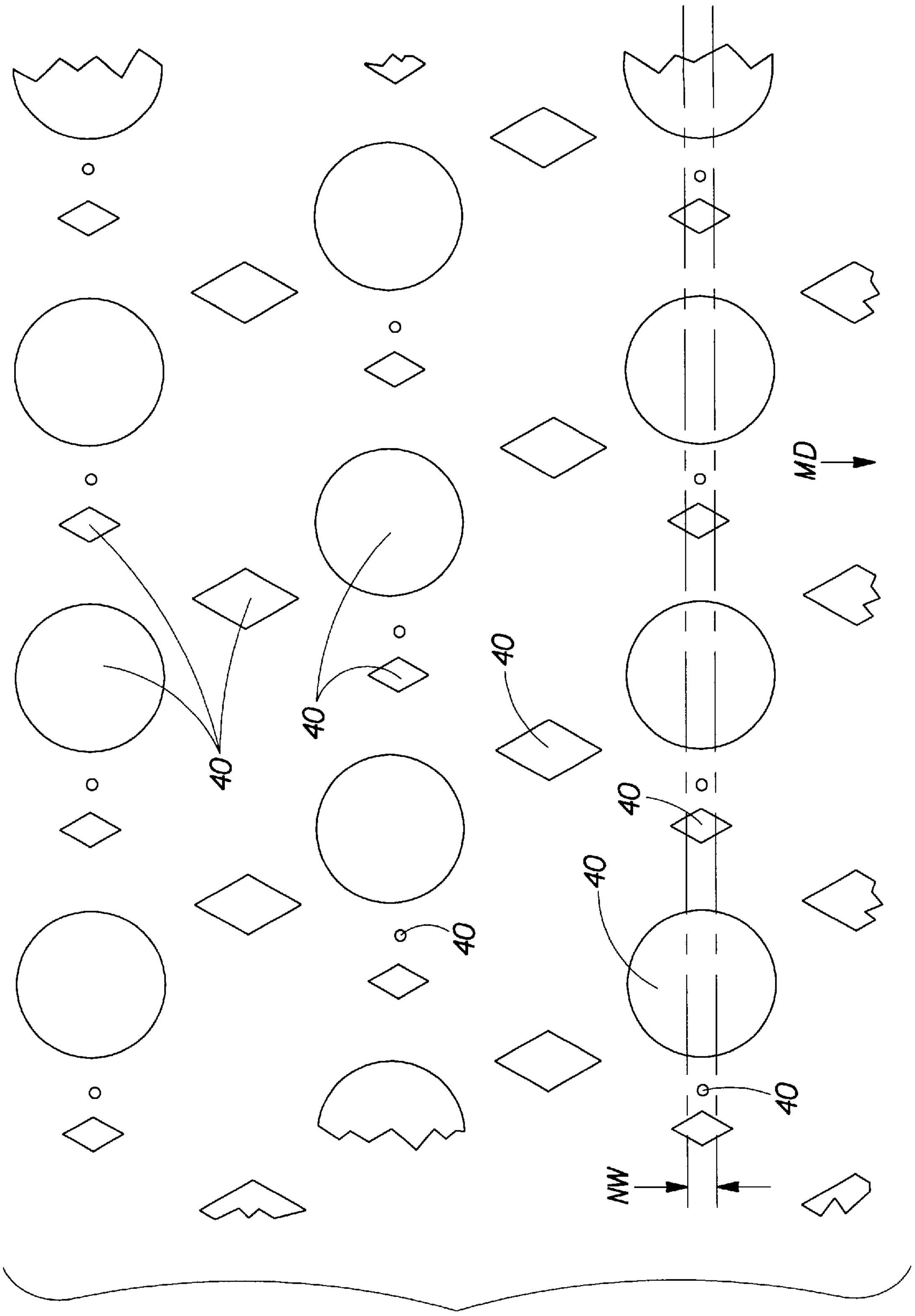
FIG. 5 is a top plan view of an embossing pattern having four sizes of repeating units, and showing the largest repeating unit centered in the nip.

The nip area is the multiple of the nip width NW and the width of the pattern roll 30 or anvil roll 32. The width of the paper 10 is taken parallel to the axes of the pattern roll 30 and anvil roll 32. The nip width NW is taken parallel to the machine direction, as shown in FIG. 5.

The nip width NW is dependent upon the pressure used to load the two rolls 30, 32 together, the thickness T of the paper 10, any flattening of the rolls 30, 32 or protuberances 34 in the nip, and the diameter of the rolls 30, 32. The nip width NW may be empirically determined, as is known in the art, by inserting carbon paper in the nip between the rolls 30, 32. The rolls 30, 32 are then loaded to the desired pressure. The nip width NW is then measured from the carbon paper. Suitable carbon paper can be obtained in a Nip Impression Kit from the Manhattan Division of Beloit Corporation of Beloit, Wis.

The nip width NW is found without the paper 10 to be embossed interposed between the rolls 30, 32. Instead, only the suitable carbon paper is utilized in determining nip width NW.

To determine nip width NW, the rolls 30, 32 are rotated to the desired position, described below, for the nip width NW measurement. Once the rolls 30, 32 are in the desired position, they are loaded together with the pressure utilized for the process according to the present invention. Such loading creates a nip impression on the carbon paper. This impression is measured in the machine direction, using any suitable scale, to give the nip width NW. Suitable scales, having 1/32 inch resolution, are available from the Starrett Company of Athol, Mass.

Referring to FIG. 5, when the nip width NW is found, the rolls 30, 32 are rotated to the desired position, so that a repeating unit 40 of the pattern roll 30 is centered on the nip. The example of FIG. 5 illustrates diamond and circular shaped repeating units 40, although it will be recognized that any desired shape of repeating unit 40 can be used in accordance with the present invention.

If the pattern roll 30 has more than one size of repeating unit 40, the largest repeating unit 40 having the largest size is centered in the nip for the nip width NW determination. The size of the repeating unit 40 is only considered in the machine direction when determining the nip width NW. If two (or more) repeating units 40 have the same largest size in the machine direction, then the repeating unit 40 having the larger size in the cross machine direction is used for determining the nip width NW. If two pattern rolls 30 are used, the pattern roll 30 having the largest repeating unit 40 is used for the nip width determination.

As noted above, the pattern roll 30 has an associated pattern land area. The pattern land area is determined by the area of the distal ends 36 of the protuberances 34. The pattern land area is the percentage of the pattern roll 30 surface area which actually contacts the paper 10 during embossing. This percentage corresponds to the cumulative surface area of the distal ends 36 of the radially extending protuberances 34 as a percentage of the surface area of the balance of the pattern roll 32.

Preferably the pattern land area comprises from about 2 to about 20 percent, and more preferably from about 3 to about 10 percent of the surface area of the pattern roll 30. The pattern land area may be mathematically determined, knowing the geometry of the rolls 30, 32 and the distal ends 36 of the protuberances 34.

Preferably the embossing pattern defined by the protuberances 34 comprises a series of discrete protuberances 34, rather than a continuous line. Discrete protuberances 34 are less likely to cut the paper 10 than protuberances 34 comprising a continuous line.

The pattern land area has an associated pattern land width. The pattern land width is the narrowest dimension of the distal end 36 of the protuberance 34. Preferably the pattern land width is at least about 0.020 inches and more preferably at least about 0.030 inches. If the pattern land width is less than that specified above, the pattern roll 30 will cut the paper 10. Cutting will particularly occur with paper 10 manufactured as a tissue product, even at relatively lower embossing pressures, such as 2,000 psi, with pattern land widths narrower than that specified above. The protuberances 34 may radially extend 0.010 to 0.070 inches, and preferably about 0.025 inches outwardly from the periphery of the pattern roll 30.

In operation, the process according to the present invention may be accomplished by providing two axially parallel rolls 30, 32 juxtaposed together to form a nip therebetween. Each of the rolls 30, 32 has an axis. Each roll 30, 32 is rotatable about its axis. The axes of the rolls 30, 32 define a loading plane which connects the centers of the rolls 30, 32.

Each of the rolls 30, 32 is relatively incompressible, and is preferably steel. At least one of the rolls 30 has a plurality of protuberances 34 extending radially outwardly therefrom. Each protuberance 34 has a distal end 36. The other roll 32 may be relatively smooth.

The rolls 30, 32 are diametrically loaded together along the loading plane connecting the centers of the rolls 30, 32. The rolls 30, 32 are loaded together with an embossing pressure of at least about 1,000 psi, as measured at the distal ends 36 of the protuberances 34.

A single ply of paper 10 is also provided. Generally, a single ply of paper 10 having a relatively high caliper and a relatively high basis weight is preferred, so that the aesthetic clarity of the embossments 20 is maximized. Also, preferably the single ply of paper has a relatively fine surface topography compared to the pattern of the desired embossments 20. More preferably the surface topography is determined by the size of deflection conduits used in a through air drying papermaking belt used to make the paper 10.

The paper 10 has opposed first and second opposed surfaces 12, 14 which are separated in the Z-direction by the thickness T of the paper 10. The paper 10 is interposed in the nip between the rolls 30, 32. Each roll 30, 32 is rotated about its respective axis, whereby the paper 10 is transported relative to the rolls 30, 32 through the nip.

The paper 10 is embossed in the nip to provide a plurality of embossments 20 corresponding to the distal ends 36 of the protuberances 34. The bottom of the embossment 20 is disposed between the first and second surfaces 12, 14 of the paper 10. The embossments 20 do not extend outwardly from the plane of the paper 10. Preferably the embossments 20 are glassined.

EXAMPLE I

The process according to the present invention has been found to work well with a smooth anvil roll 32 and a pattern roll 30 having 28 discrete protuberances 34 per square inch. Each protuberance 34 was elliptically shaped and had major and minor axes of 0.080 inches and 0.040 inches, respectively. The protuberances 34 were spaced on a 45° pitch of 0.117 inches. The rolls 30, 32 had a ten inch diameter, a pattern land area of 8 percent, and were loaded to a nip width NW of 0.18 inches under an embossing pressure of 5,300 psi.

The single ply of paper 10 was made according to commonly assigned U.S. Pat. No. 4,191,609, issued to Trokhan and incorporated herein by reference. This paper 10 had approximately 1450 bilaterally staggered domes per square inch. The paper 10 had a basis weight of 18 pounds per 3,000 square feet and a tri-layered furnish of nominally 35% eucalyptus in the two outer layers and 30% in the central layer. The resulting embossments 20 were glassined and had a pleasing and distinctive aesthetic clarity relative to the background of the paper 10.

EXAMPLE II

This experiment was repeated with a single ply of paper 10 made according to commonly assigned U.S. Pat. No. 4,637,859. The paper 10 had a bow-tie shaped pattern of approximately 78 domes per square inch. This single ply of paper 10 was not acceptably embossed according to the present invention. The same embossing pattern which worked well in the previous example was neither distinct from the background, nor aesthetically pleasing in this example.

Alternatives to the process described above are within the scope of this invention. For example, if one wished to produce a paper 10 according to the present invention having embossments 20 which extend inwardly from both the first side 12 and the second side 14 of the paper 10, wherein the embossments 20 are offset from one another, one could substitute the dual ply lamination rolls 30 disclosed in the aforementioned incorporated U.S. Pat. No. 5,294,475 patent issued to McNeil for the rolls 30, 32 described above. The rolls 30 in the McNeil '475 patent each have radially extending protuberances 34. The radially extending protuberances 34 of each roll contact the periphery of the other roll 32, 30.

If one desires to produce a paper 10 according to the present invention having embossments 20 extending inwardly from the first side 12 and the second side 14, wherein the embossments 20 are registered with one another, one could use the knob-to-knob embossing process disclosed in the aforementioned incorporated U.S. Pat. No. 3,414,459 issued to Wells. Each roll 30 in the Wells '459 patent also has radially extending protuberances 34. The radially extending protuberances 34 of one roll 30 contact the radially extending protuberances 34 of the other roll 30.

Alternatively, if one wishes to avoid the use of rolls 30, 32 altogether for embossing according to the present invention, one may use flat plates for the embossing process. One flat plate serves as an anvil plate. The other flat plate is patterned as described above. As discussed above relative to the rolls 30, 32, the plates should be rigid and non-deformable. The plates are preferably maintained mutually parallel and are loaded together in the direction perpendicular to at least one of the plates. A flat plate embossing process suffers from the disadvantage it entails a batch process, rather than the continuous process described above. But, prophetically a flat plate embossing process provides the advantage of greater contact time with the paper 10, thereby improving the aesthetic distinction of the embossments 20.

What is claimed is:

1. A single ply paper having two opposed sides, a first side and a second side, said paper being embossed and having embossments extending inwardly from said second side of said paper towards the other said side of said paper, whereby said embossments do not extend outwardly from either said side of said paper, said paper having domes extending outwardly from the first side of said paper.

2. The paper according to claim 1 wherein said embossments comprise glassined regions in said paper.

3. The paper according to claim 1 wherein each of said embossments has a greater area than each of said domes.

4. A through air dried paper according to claim 1 having at least 300 domes per square inch.

5. A single ply of paper having two opposed sides, a first side and a second side, said single ply of paper having embossments extending inwardly from each of said first side and said second side, said paper having no embossments extending outwardly from either said side, the area intermediate said embossments remaining relatively unembossed, said paper having domes extending outwardly from said first side of said paper.

6. The paper according to claim 5, said embossments being registered wherein said embossments extending inwardly from said first side correspond in position to said embossments extending inwardly from said second side.

7. The paper according to claim 5, said embossments being offset, wherein said embossments extending inwardly from said first side do not correspond in position to said embossments extending inwardly from said second side.

8. A process for embossing a single ply of paper, said process comprising the steps of:

providing two axially parallel rolls juxtaposed to form a nip therebetween, each of said rolls having an axis, said axes of said rolls defining a loading plane connecting the centers of said rolls, at least one of said rolls having a plurality of protuberances extending radially outwardly therefrom to a like plurality of distal ends, each of said rolls being relatively incompressible;

loading said rolls together in said loading plane with an embossing pressure of at least 1,000 psi at the distal ends of said protuberances;

providing a single ply of paper having opposed first and second sides separated by the thickness of said paper;

interposing said paper in said nip between said rolls;

rotating each of said rolls about its respective axis, whereby said paper is transported relative to said rolls; and embossing said paper to provide a plurality of inwardly extending embossments corresponding to said distal ends of said protuberances, said embossments being intermediate said first side and said second side of said paper, whereby said embossments do not extend outwardly beyond either said side of said paper.

9. A process according to claim 8 wherein one of said rolls has protuberances extending therefrom and one of said rolls has a relatively smooth surface.

10. A process according to claim 9 wherein said step of embossing said paper produces paper having embossments extending unidirectionally inwardly from one said side of said paper.

11. A process according to claim 10 wherein said paper is through air dried, and has domes extending outwardly from said first side of said paper.

12. A process according to claim 11 wherein said paper is interposed in said nip with said domes oriented away from said protuberances, whereby upon embossing said embossments extend inwardly from said second side of said paper.

13. A process for embossing a single ply of paper, said process comprising the steps of:

providing two axially parallel rolls juxtaposed to form a nip therebetween, each of said rolls having an axis, said axes of said rolls defining a loading plane connecting the centers of said rolls, each of said rolls having a plurality of protuberances extending radially outwardly therefrom, each said protuberance terminating at a distal end;

loading said rolls together in said plane to provide an embossing pressure of at least 1,000 psi at the distal ends of said protuberances;

providing a single ply of paper having two opposed sides, a first side and a second side, said first side and said second side being separated by the thickness of said paper;

interposing said paper between said rolls in said nip;

rotating each of said rolls about its respective axis, whereby said paper is transported relative to said rolls; and embossing said paper to provide a first plurality of said embossments extending inwardly from said first side of said paper towards said second side of said paper, and a second plurality of said embossments extending inwardly from said second side of said paper towards said first side of said paper.

14. The process according to claim 13 wherein said protuberances of each said roll contact the periphery of the other said roll at said nip, wherein upon embossing said paper said first plurality of embossments and said second plurality of embossments are mutually offset from each other.

15. The process according to claim 14 wherein said embossing pressure is at least 3,000 psi.

16. The process according to claim 13 wherein said distal ends of said protuberances on each said roll contact said distal ends of said protuberances on the other said roll at said nip, whereby said first plurality of embossments and said second plurality of embossments are registered with each other.

17. The process according to claim 16 wherein said rolls are loaded together with a pressure of at least 3,000 psi.

* * * * *